United States Patent
Lakkis

(10) Patent No.: US 8,472,497 B2
(45) Date of Patent: Jun. 25, 2013

(54) MILLIMETER WAVE BEACONING WITH DIRECTIONAL ANTENNAS

(75) Inventor: Ismail Lakkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 658 days.

(21) Appl. No.: 12/248,771

(22) Filed: Oct. 9, 2008

(65) Prior Publication Data

US 2009/0110031 A1    Apr. 30, 2009

Related U.S. Application Data

(60) Provisional application No. 60/998,278, filed on Oct. 10, 2007.

(51) Int. Cl.
*H04B 1/69* (2006.01)
(52) U.S. Cl.
USPC .......................................................... 375/130
(58) Field of Classification Search
USPC .................. 375/130, 146, 295, 315; 370/329, 370/334; 455/63.4, 562.1, 101
See application file for complete search history.

(56) References Cited

U.S. PATENT DOCUMENTS

| | | | |
|---|---|---|---|
| 3,622,982 A | 11/1971 | Clark, Jr. et al. | |
| 4,346,475 A | 8/1982 | Alexis | |
| 4,397,022 A | 8/1983 | Weng et al. | |
| 4,849,976 A | 7/1989 | Schilling et al. | |
| 4,901,317 A | 2/1990 | Rushforth et al. | |
| 4,926,422 A | 5/1990 | Alaria et al. | |
| 4,933,956 A | 6/1990 | Forney, Jr. | |
| 5,717,871 A | 2/1998 | Hsieh et al. | |
| 5,805,613 A | 9/1998 | Beery et al. | |
| 5,914,933 A | 6/1999 | Cimini et al. | |
| 5,968,199 A | 10/1999 | Khayrallah et al. | |

(Continued)

FOREIGN PATENT DOCUMENTS

| | | |
|---|---|---|
| EP | 1953924 A1 | 8/2008 |
| JP | 2002280942 A | 9/2002 |

(Continued)

OTHER PUBLICATIONS

Gojay M J E: "Complementary Series" IRE Transactions on Information Theory, IEEE Inc. New York, US, vol. IT-07, No. 2, Apr. 1, 1961, XP009050014.

(Continued)

*Primary Examiner* — Khanh C Tran
(74) *Attorney, Agent, or Firm* — Dang M. Vo

(57) ABSTRACT

A wireless device comprises a code-assignment module configured for assigning Golay codes to be used for spreading, a spreading module configured for spreading data with the Golay codes to produce a signal, wherein the Golay codes are randomly used to spread the data, and a transmitter configured for transmitting the signal. The wireless device may transmit a first beacon signal via a set of quasi-omni beam patterns, and a second beacon signal via a set directional beam patterns. The first beacon signal has a first transmission rate that is higher than the second beacon signal's the transmission rate. Extended Golay codes having zero periodic cross-correlation may be generated from a Golay code and a set of short sequences. A data block transmitted by the wireless device may comprise Golay codes and data portions, wherein every data portion is between two Golay codes and every Golay code is between two data portions.

14 Claims, 11 Drawing Sheets

U.S. PATENT DOCUMENTS

| | | | |
|---|---|---|---|
| 6,005,840 | A | 12/1999 | Awater et al. |
| 6,134,261 | A | 10/2000 | Ryan |
| 6,189,125 | B1 | 2/2001 | Classon |
| 6,324,668 | B1 | 11/2001 | Classon |
| 6,404,732 | B1 | 6/2002 | van Nee |
| 6,452,958 | B1 | 9/2002 | van Nee |
| 6,453,168 | B1 | 9/2002 | McCrady et al. |
| 6,567,482 | B1 | 5/2003 | Popovic' |
| 6,643,281 | B1 | 11/2003 | Ryan |
| 6,658,632 | B1 | 12/2003 | Parulkar et al. |
| 6,661,854 | B2 | 12/2003 | Rudolf et al. |
| 6,674,819 | B2 | 1/2004 | Rudolf et al. |
| 6,795,513 | B2 | 9/2004 | Jechoux et al. |
| 6,804,191 | B2 | 10/2004 | Richardson |
| 6,839,876 | B1 | 1/2005 | Tong et al. |
| 6,895,258 | B1 * | 5/2005 | Scherzer et al. ........... 455/562.1 |
| 6,922,406 | B2 | 7/2005 | Rudolf et al. |
| 6,977,974 | B1 | 12/2005 | Geraniotis et al. |
| 6,996,418 | B2 * | 2/2006 | Teo et al. ................... 455/562.1 |
| 7,010,071 | B1 | 3/2006 | Michel et al. |
| 7,039,036 | B1 | 5/2006 | Dabak et al. |
| 7,042,868 | B2 | 5/2006 | Runkle et al. |
| 7,062,002 | B1 | 6/2006 | Michel et al. |
| 7,106,787 | B2 | 9/2006 | Chang et al. |
| 7,116,650 | B2 * | 10/2006 | Takeuchi et al. .............. 370/329 |
| 7,130,586 | B2 * | 10/2006 | Corbett et al. ................ 455/63.4 |
| 7,289,588 | B2 | 10/2007 | Suh et al. |
| 7,292,641 | B2 | 11/2007 | Suh et al. |
| 7,356,008 | B2 | 4/2008 | Mottier et al. |
| 7,400,654 | B2 | 7/2008 | Raaf |
| 7,483,367 | B2 | 1/2009 | Chayat et al. |
| 7,486,737 | B2 | 2/2009 | Trainin et al. |
| 7,508,866 | B2 | 3/2009 | Chang et al. |
| 7,616,622 | B2 | 11/2009 | Rudolf et al. |
| 7,680,230 | B2 | 3/2010 | Koppelaar |
| 7,684,473 | B2 | 3/2010 | Walton et al. |
| 7,711,032 | B2 | 5/2010 | Diaz Fuente |
| 7,817,967 | B2 * | 10/2010 | Karabinis et al. ............. 455/101 |
| 2004/0071195 | A1 | 4/2004 | Huang et al. |
| 2004/0213145 | A1 | 10/2004 | Nakamura |
| 2006/0245505 | A1 | 11/2006 | Limberg |
| 2007/0014331 | A1 | 1/2007 | Eldon et al. |
| 2007/0113159 | A1 | 5/2007 | Lakkis |
| 2007/0168841 | A1 | 7/2007 | Lakkis |
| 2007/0245221 | A1 | 10/2007 | Lakkis |
| 2009/0097533 | A1 | 4/2009 | Lakkis |
| 2009/0100316 | A1 | 4/2009 | Lakkis |
| 2009/0100317 | A1 | 4/2009 | Lakkis |
| 2009/0125792 | A1 | 5/2009 | Lakkis |
| 2009/0201974 | A1 | 8/2009 | Song et al. |
| 2011/0209035 | A1 | 8/2011 | Lakkis |

FOREIGN PATENT DOCUMENTS

| | | |
|---|---|---|
| JP | 2004515935 A | 5/2004 |
| JP | 2004364285 A | 12/2004 |
| WO | WO03047140 A1 | 6/2003 |
| WO | WO2007056948 A1 | 5/2007 |

OTHER PUBLICATIONS

International Search Report—PCT/US08/079597, International Search Authority—European Patent Office—Jan. 19, 2009.

Written Opinion—PCT/US08/079597, International Search Authority—European Patent Office , Jan. 19, 2009.

Cheolhee Park et al: "Short-Range Wireless Communications for Next-Generation Networks: UWB, 60 GHz Millimeter-Wave WPAN, and ZigBee" IEEE Wireless Communications, IEEE Service Center, Piscataway, NJ, US, col.14, No, 4, Aug. 1, 2007, XP011191781.

Domenico Antonio Fittipaldi et al: "ieee 802.15,3c Medium Access Controller Throughput for Phased Array Systems" IEEE International Symposium on Personal Indoor and Mobile Radio Communications. PIMRC, IEEE; PI, XX Sep. 1, 2007 XP031188545.

Fumihide Kojima et al. "Necessary Modifications on Conventional IEEE802.15,3b MAC to Achieve IEEE802.15.3c Millimeter Wave WPAN" IEEE International Symposium on Personal Indoor and Mobile Radio Communications, PIMRC, IEEE: PI. XX. Sep. 1, 2007, XP031168693.

Guangqi Yang et al: "Design of Synchoronization Sequences in a MIMO Demonstration System" Wireless Communications and Applied Computational Electromagnetics, 20 05, IEEE/ACES International Conference on Honolulu, HI Apr. 3-7, 2005, Piscataway, NJ, USA, IEEE, Apr. 3, 2005, pp. 40-43, XP010826457.

Hiroshi Harada; "IEEE 802 15-07-0761-10-003c Unified and flexible millimeter wave WPAN systems supported by common mode" TG3C, Sep. 18, 2007 XP002508475.

Lakkis I. et al: "IEEE 802.15-0760-03-003c mmWave OFDM Physical Layer Proposal" IEEE 802.15 TG3C, 09-19-07 19, XP002507726.

Nortel Networks: "Clarifications on Golay-Hadamard Sequence Based RACH Preamble" 3GPP Draft R1-99C28, 3RD Generation Partnership Project (3GPP), Mobile Competence Centre; 650, Route Des Lucioles: F-06921 Sophia-Anitpolis Cedex: France, vol.tsg_ran\WG1_RL1/TSGR1_07/Docs/Pdfs, no. Hannover; 19990830. Aug. 26, 1999, XP050089422.

Pengfei Xia, et al: "Short Range Gigabit Wireless Communications Systems: Potentials, Challenges and Techniques" Ultra_Wideband, 2007. ICUWB 2007. IEEE International Conterence on, IEEE, PI Sep. 1, 2007 XP031159333.

Ryuhei Funada et al: "A design of single carrier based PHY for IEEE 802.15.3c standard" IEEE International Symposium on Personal Indoor and Mobile Radio Communications. PIMRC, IEEE;PI, XX, Sep. 1, 2007, XP031168950.

Sivaswamy, R. "Multiphase Complementary Codes," IEEE Transactions on Information Theory, vol. IT-24. No. 5, Sep. 1976.

IEEE 802.11b, "Part 11: Wireiess LAN Medium Access Control (MAC) and Physical Layer (PHY) specifications: Higher-Speed Physical Layer Extension in the 2.4 GHz Band," Sep. 16, 1999.

S.Z. Budisin, "Efficient pulse compressor for Golay complementary Sequences." Electronic Letters, 27, No. 3, pp. 219-220, Jan. 31, 1991.

IEEE 802.15.3c, "Part 15.3: Wireless Medium Access Control (MAC) and Physical Layer (PHY) Specifications for High Rate Wireless Personal Area Networks (WPANs)," Amendment 2: Millimeter-wave-based, Alternative Physical Layer Extension, (Amendment to IEEE Std 802.15.3-2003), Oct. 12, 2009, pp. 1-187.

Chung, "Optical Orthogonal codes: Design, Analysis and Applications", May 1989, IEEE vol. 35 No. 3, pp. 595-604.

Taiwan Search Report—TW097139244- TIPO—Oct. 27, 2011.

Bulumulla; "A systematic approach to detecting OFMD signals in a fading channel", May 2000, IEEE Vo. 48 No. 5, pp. 1-4.

* cited by examiner

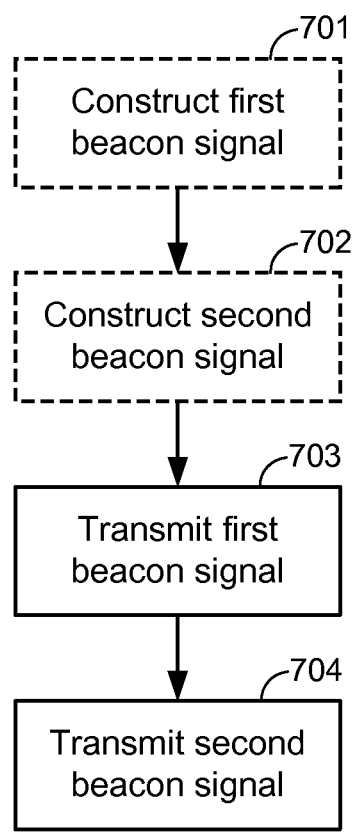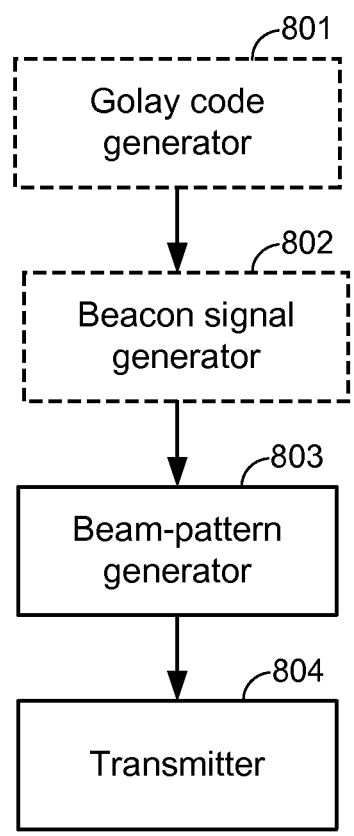
Figure 7
Figure 8

MILLIMETER WAVE BEACONING WITH DIRECTIONAL ANTENNAS

CLAIM OF PRIORITY UNDER 35 U.S.C. §119

The present Application for Patent claims priority to Provisional Application No. 60/998,278 filed Oct. 10, 2007, and assigned to the assignee hereof and hereby expressly incorporated by reference herein.

BACKGROUND

I. Field of the Invention

The invention relates generally to generating spread-spectrum coding, and particularly to generating and processing Golay codes.

II. Description of the Related Art

In one aspect of the related art, a Physical Layer supporting both single carrier and Orthogonal Frequency Division Multiplexing (OFDM) modulation may be used for millimeter wave (e.g., 60 GHz) communications. For example, aspects of the invention may be configured for millimeter wave communications in the 57 GHz-66 GHz spectrum (e.g., 57 GHz-64 GHz in the United States, and 59 GHz-66 GHz in Japan).

Both OFDM and single-carrier modes further include a single-carrier common mode. The common mode is a base-rate mode employed by both OFDM and single-carrier transceivers to facilitate co-existence and interoperability between different devices and different networks. The common mode may be employed for beaconing, transmitting control information, and as a base rate for data packets. Common-mode data is spread by Golay codes and employs $\pi/2$-BPSK modulation.

A single-carrier transceiver in an IEEE802.15.3c network typically employs at least one Golay-code generator to provide Golay codes to all of the fields of a transmitted data frame and to perform matched-filtering of a received Golay-coded signal. Complementary codes, first introduced by Golay, are sets of finite sequences of equal length such that the number of pairs of identical elements with any given separation in one sequence is equal to the number of pairs of unlike elements having the same separation in the other sequences. S. Z. Budisin, "Efficient pulse compressor for Golay complementary sequences," *Electronic Letters*, 27, no. 3, pp. 219-220, 31 Jan. 1991, which is hereby incorporated by reference, shows a transmitter for generating Golay complementary codes as well as a Golay matched filter.

SUMMARY

Aspects disclosed herein may be advantageous to systems employing millimeter-wave WPANs, such as defined by the IEEE802.15.3c protocol. However, the invention is not intended to be limited to such systems, as other applications may benefit from similar advantages.

In one aspect of the invention, a transmitter is configured for assigning Golay codes to be used for spreading, spreading data with the Golay codes to produce a signal, wherein the Golay codes are randomly used to spread the data, and transmitting the signal.

In another aspect of the invention, a transmitter is configured for transmitting a first beacon signal via a set of quasi-omni beam patterns and a second beacon signal via a set of directional beam patterns, wherein a first rate associated with the transmission of the first beacon signal is higher than a second rate associated with the transmission of the second beacon signal.

In another aspect, a transmitter or a receiver generates a preamble using an extended Golay code. The extended Golay code is selected from a set of extended Golay codes having zero periodic cross-correlation, which are generated from a Golay code and a set of short sequences.

In yet another aspect, a transmitter generates a first data block comprising Golay codes and data portions, wherein every data portion is between two Golay codes.

Although particular aspects are described herein, many variations and permutations of these aspects fall within the scope of the invention. Whereas some benefits and advantages of the preferred aspects are mentioned, the scope of the invention is not intended to be limited to particular benefits, uses, or objectives. Rather, aspects of the invention are intended to be broadly applicable to different wireless technologies, system configurations, networks, and transmission protocols, some of which are illustrated by way of example in the figures and in the following Detailed Description. The detailed description and drawings are merely illustrative of the invention rather than limiting, the scope of the invention being defined by the appended claims and equivalents thereof.

BRIEF DESCRIPTION OF THE DRAWINGS

Aspects according to the invention are understood with reference to the following figures.

FIG. 7 is a flow diagram for a communication method in accordance with a sample aspect of the invention.

FIG. 8 is a block diagram of a sample apparatus configured in accordance with a sample aspect of the invention.

DETAILED DESCRIPTION

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

In the following description, for the purposes of explanation, numerous specific details are set forth in order to provide a thorough understanding of the invention. It should be understood, however, that the particular aspects shown and described herein are not intended to limit the invention to any particular form, but rather, the invention is to cover all modifications, equivalents, and alternatives falling within the scope of the invention as defined by the claims.

Figure 1:
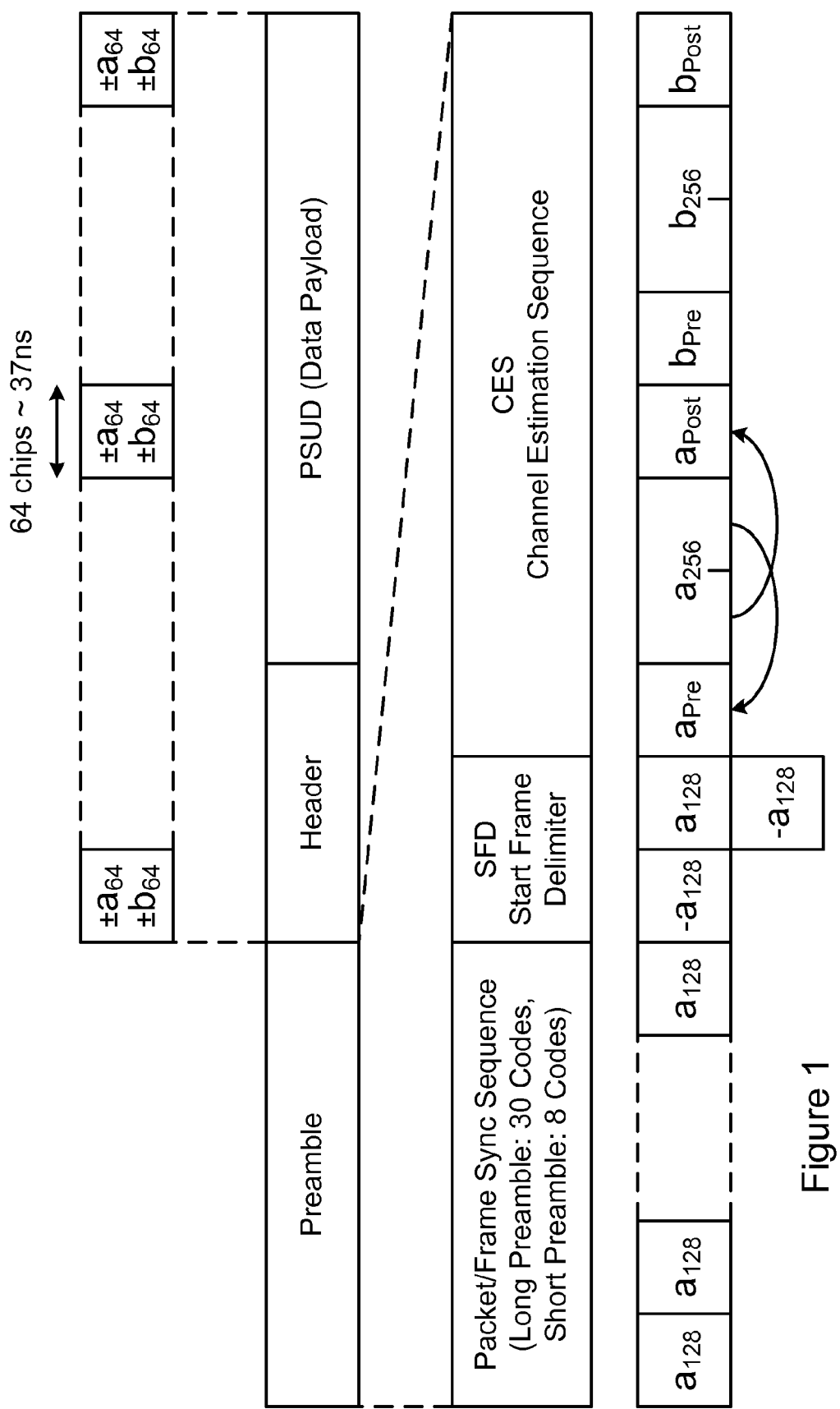
FIG. 1 is a diagram of a frame structure for a packet in a common-mode communication signal in accordance with a sample aspect of the invention.

FIG. 1 is a representation of a frame structure for a packet of a common-mode communication signal in accordance with an aspect of the invention. The common-mode signal comprises Golay spreading codes with chip-level π/2-BPSK modulation. A preamble may comprise either 8 or 30 repetitions of a Golay code having length 128 (e.g., a Golay code denoted by $a_{128}$). A preamble, as used herein, may further include pilot signals (not shown). A PLCP header and a PSDU (i.e. data payload) comprise symbols spread with a Golay code pair of length 64 (such as Golay codes $a_{64}$ and $b_{64}$). A long preamble (i.e., the preamble comprising 30 repetitions of the Golay code) is typically implemented as a default preamble. However, the preamble may be switched to a short preamble (i.e., the preamble comprising 8 repetitions of the Golay code) upon either an implicit or explicit device request.

Various frame parameters, including, by way of example, but without limitation, the number of Golay-code repetitions and the Golay-code lengths may be adapted in accordance with aspects of the invention. In one aspect, Golay codes employed in the preamble may be selected from length-128 or length-256 Golay codes. Golay codes used for data spreading may comprise length-64 or length-128 Golay codes.

Figure 2:
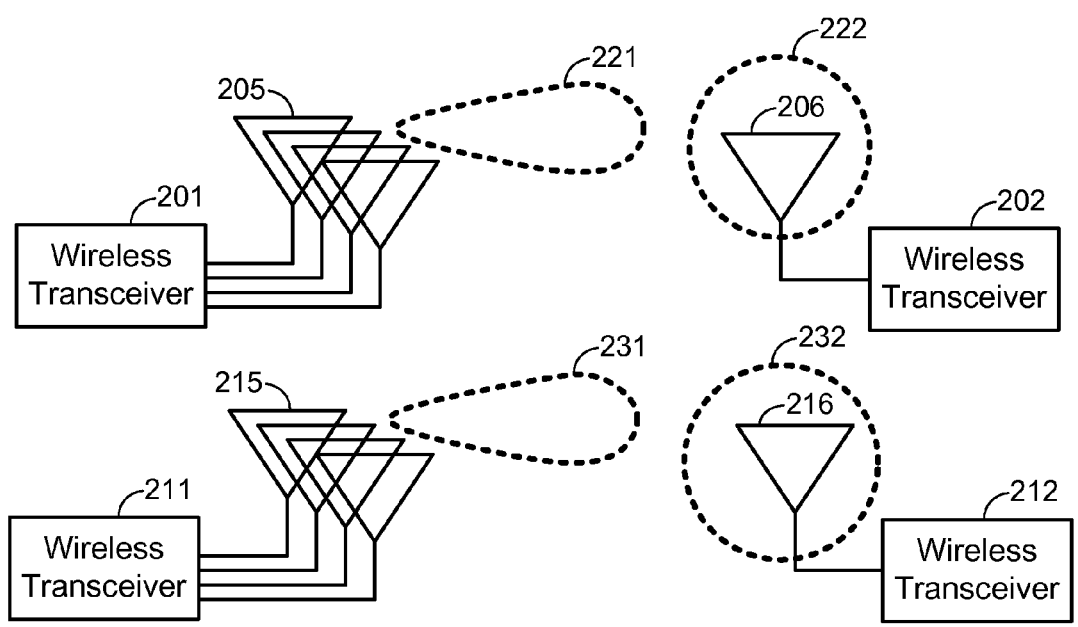
FIG. 2 illustrates communication links between two pairs of wireless transceivers.

Aspects of the invention may employ beamforming. For example, FIG. 2 illustrates a communication links between two pairs of wireless transceivers. A first communication link is provided between a first wireless transceiver 201 and a second wireless transceiver 202. A second communication link is provided between a third wireless transceiver 211 and a fourth wireless transceiver 212.

The first wireless transceiver 201 comprises an antenna array 205, which is configured for producing a first directional beam pattern 221. The second wireless transceiver 202 comprises a single antenna 206, which produces a first substantially omni-directional beam pattern 222. The third wireless transceiver 211 comprises an antenna array 215 and is configured for producing a second directional beam pattern 231. The fourth wireless transceiver 212 comprises a single antenna 216, which produces a second substantially omni-directional beam pattern 232.

In one aspect, the wireless transceiver 201 employs its direction beam pattern 221 to transmit HDTV signals to the second wireless transceiver 202. During the transmission, the second wireless transceiver 202 is primarily in a receiving mode. However, the second wireless transceiver 202 may transmit an acknowledgement message (e.g., an ACK or NACK) to acknowledge whether data packets were received correctly. Similarly, the third wireless transceiver 211 transmits signals via its directional beam pattern 215 to the fourth wireless transceiver 212, which also returns acknowledgement messages.

Typically, the pair of communication links employs different frequency channels to avoid interference. However, since the first and third wireless transceiver 201 and 211 employ directional beam patterns, the same frequency channel may be used for both communication links. The omni-directional transceivers 202 and 212 use a low-data rate mode, such as a common mode, to return acknowledgement messages and other information. Interference may occur when one of the omni-directional transceivers 202 and 212 transmits an acknowledgement message in the same frequency band and at the same time the other omni-directional transceiver 212 or 202 is in receiving mode. In order to mitigate interference between the omni-directional transceivers 202 and 212, each link may employ a set of Golay codes selected from a plurality of Golay-code sets having low-cross correlations relative to each other.

In accordance with one aspect of the invention, any of a set of six Golay complementary code pairs may be employed. For example, a set of six Golay code pairs is generated using a delay vector D=[32, 8, 2 16, 1, 4] and the following seed vectors:

$$W^1 = [+1, +1, -j, +j, -j, +1]$$

$$W^2 = [+1, +1, -1, +1, +j, +j]$$

$$W^3 = [-j, +1, +1, -1, -1, +j]$$

$$W^4 = [+j, +j, -j, -1, +1, +1]$$

$$W^5 = [-1, +1, -1, -1, +j, +j]$$

$$W^6 = [+j, +1, +1, -1, -1, +j]$$

The periodic cross correlation between the resulting Golay complementary codes is less than 16, and the periodic auto-correlation function has a zero-correlation zone (i.e., no side lobes) around the main correlation peak. Since the same delay vector is used to generate all six codes, and only the seed vector is configurable, code generators configured to generate different Golay complementary code pairs may share the same hardware configuration. Input signals may include a Dirac impulse signal. The output comprises the complex-conjugate Golay pair codes in reverse order. For example, the code generator may produce Golay complementary code pairs that are mother codes($a^i_{64}$, $b^i_{64}$) of length 64. The common mode may employ such Golay codes of length 64 or 128 for data spreading.

It is well know that Golay codes do not have perfect aperiodic autocorrelation. Rather, the autocorrelation of a Golay code has a main peak and some sidelobes having well-defined positions. Consequently, after Golay matched-filtering, the sidelobes appear as channel distortions resembling paths of a multipath channel. Such false paths can cause a Rake receiver to mistake the sidelobes as multipath components of a received signal. Thus, aspects of the invention may be configured to employ codes that randomize the locations of autocorrelation sidelobes.

One aspect may employ a set of codes (instead of a single code) for data spreading. For example, each of a plurality of data symbols may be spread with a different spreading code. Adjacent data symbols may employ different spreading codes, or a different spreading code may be employed for each of a plurality of adjacent symbols. Furthermore, each set of devices supporting a different communication link in the same frequency channel may use a unique set of codes. Each set of codes may be derived from circularly shifted versions of a Golay code.

In one aspect, each circularly shifted Golay code is produced by employing a constant shift. For example, a second Golay code is produced by circularly shifting a first Golay code by a predetermined amount. A third Golay code is produced by circularly shifting the second Golay code by the predetermined amount. All subsequent Golay codes are also produced by employing the same circular shift. In another aspect, circular shifts between Golay codes may comprise different amounts.

In one aspect of the invention, a set of codes may be derived from the same delay vector but with different seed vectors. This allows the same hardware to be used to generate the different Golay codes by simply employing different seed vectors. This can provide up to six sets of Golay codes (or code pairs) generated from the same delay vector, but with a programmable set of seed vectors. In this case, the seed vector may be changed for each data symbol to be spread. Alternatively, a Reed Solomon code may be employed and the seed vector changed every 8 symbols.

Figure 3:
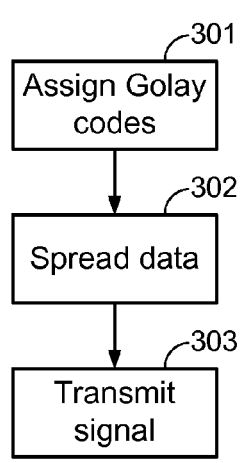
FIG. 3 illustrates a method for implementing wireless communications in accordance with a sample aspect of the invention.

FIG. 3 illustrates a method for implementing wireless communications in a spatial multiplexing channel in accordance with one aspect of the invention. In spatial multiplexing, multiple communication links are assigned to a common frequency channel. A Golay-code assignment step 301 provides for assigning a unique set of Golay codes to each of a plurality of potentially interfering communication links. The assignment step 301 may comprise determining if interference is likely to occur between communication links. For example, the assignment step 301 may be configured to determine if two or more transceivers with omni-directional beam patterns are in close proximity. Alternatively, the assignment step 301 may be configured for detecting co-channel interference between links, and if the interference exceeds a predetermined threshold, each link may be assigned a unique set of Golay codes.

The assigned codes may comprise Golay codes stored in memory (i.e., predetermined codes) or Golay codes generated on the fly. Generating the codes may precede or follow the assignment step 301. In one aspect, the assigned codes are generated by each transceiver. For example, cyclic shifts of a Golay code may be employed for generating multiple spreading codes. Complementary Golay codes may be employed. In some aspects of the invention, a plurality of seed vectors may be employed in a Golay-code generator having a fixed delay vector. Alternatively, a Golay-code generator may comprise multiple delay vectors. Any combination of the previously recited code-generation techniques may be employed in aspects of the invention.

A spreading step 302 provides for spreading data with the selected spreading codes. For example, each transceiver may be configured to spread 302 its data with its corresponding prescribed set of spreading codes. The spreading step 302 may be further configured to use the Golay codes to randomly spread the data. For example, the spreading step 302 may comprise changing the spreading code for each symbol or for each of a predetermined set of symbols to produce a spread signal that is transmitted 303. This flattens the spectrum of the transmitted signal. At a Golay matched-filter receiver, spreading can randomize the locations of autocorrelation sidelobes.

Figure 5:
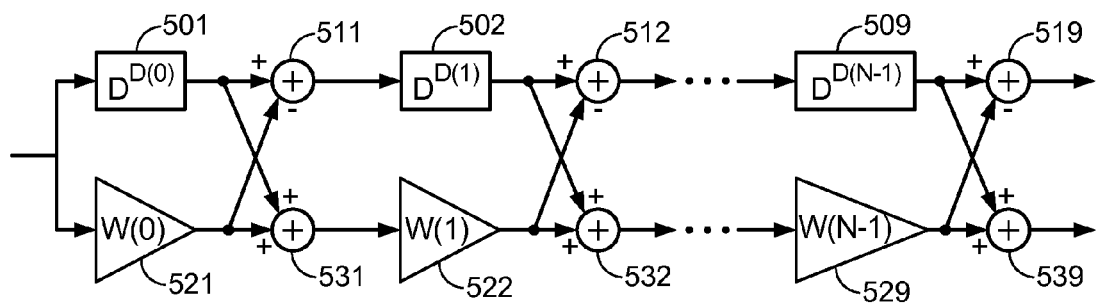
FIG. 5 is a block diagram of a Golay-code generator that may be employed in some aspects of the invention.

Golay code generation may be performed using a combination of delay elements, seed vector insertion elements, multiplexers, and/or one or more combiners, such as described with respect to FIG. 5. Since Golay code generation is an iterative process employing memory from previous iterations, matched filtering at a receiver may be performed with two or more Golay matched filters such that adjacent symbols with different codes are handled by different matched filters. For example, if two filters are employed, a first filter may process even-numbered symbols, and a second filter may process odd-numbered symbols.

Figure 4:
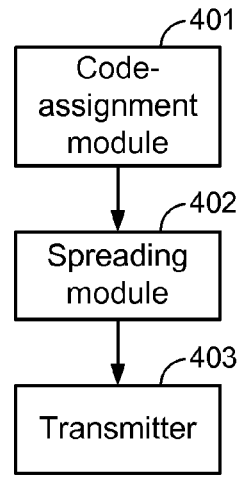
FIG. 4 is a block diagram of an apparatus configured for communicating in a millimeter-wave system.

FIG. 4 is a block diagram of an apparatus configured for communicating in a millimeter-wave system. A means for assigning Golay codes to be used for spreading may include a Golay-code assignment module 401 configured for selecting predetermined Golay codes stored in memory or dynamically generating Golay codes. The code-assignment module 401 may comprise a computer-processing element and a memory wherein the computer-processing element is configured for selecting one or more Golay codes stored in the memory. The computer-processing element may be configurable for performing calculations, such as determining cross-correlation values or other relationships between candidate Golay codes.

According to one aspect of the invention, the code-assignment module 401 may select Golay codes having low cross-correlation for use in different communication links. For example, the code-assignment module 401 may select one or more Golay codes for its communication link that have low cross-correlation with Golay codes employed in another communication link used by a different system.

FIG. 5 is a block diagram of a Golay-code generator that may be employed in some aspects of the invention. The Golay-code generator comprises a sequence of delay elements 501-509, a sequence of adaptable seed vector insertion elements 521-529, a first set of combiners 511-519, and a second set of combiners 531-539 configured for combining delayed signals with signals multiplied by the seed vector.

According to one aspect of the invention, the sequence of delay elements 501-509 is configured for providing a predetermined set of fixed delays D=[D(0), D(1), . . . , D(N−1)] to a first input signal. The sequence of adaptable seed vector insertion elements 521-529 is configured for multiplying a second input signal by at least one of a plurality of different seed vectors $W^i$=[$W^i$(0), $W^i$(1), . . . , $W^i$(N−1)], i=1, . . . , L, where L is the number of Golay code pairs. The seed vector insertion elements 521-529 are programmable, and each seed vector produces a different Golay complementary code pair. The seed vectors may include any combination of binary and complex symbols. For binary codes, W(k)=±1. For complex codes, W(k)=±1 and ±j. The delay profile (i.e., the delay vector) provided by the delay elements 501-509 may be fixed, even when the code generator is configured to produce multiple Golay complementary code pairs.

A means for spreading data with the Golay codes may include a spreading module 402 configured for spreading each data symbol with the selected Golay codes to produce a spread signal. The spreading module 402 is configured to employ the selected Golay codes in a way that randomly spreads the data. For example, the spreading module 402 may comprise a randomizer (not shown) configured for randomizing the order in which Golay codes are used to spread data.

According to one aspect of the invention, the spreading module 402 may comprise a cyclic shifting module (not shown) for cyclically shifting the selected Golay codes before they are used to spread data. A cyclic shift of a Golay code comprises moving one or more elements from the end of a Golay code vector $a=[a_0\ a_1\ \ldots\ a_{N-1}]$ to the beginning of the vector. For example, a cyclic shift of one element of the Golay code vector $a^{(0)}=[a_0\ a_1\ \ldots\ a_{N-1}]$ can be expressed as $a^{(1)}=[a_{N-1}\ a_0\ a_1\ \ldots\ a_{N-2}]$. Alternative aspects of the invention may employ different cyclic shifts.

A means for transmitting the spread signal may comprise a transmitter 403 configured for up-converting, amplifying, and coupling the spread data signal into a wireless communication channel. The transmitter 403 typically comprises a digital-to-analog converter, a frequency up-converter, a power amplifier, and an antenna configured for coupling the transmission into a wireless communication channel.

Various aspects described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media may include, but are not limited to, magnetic storage devices, optical disks, digital versatile disk, smart cards, and flash memory devices.

Figure 6:
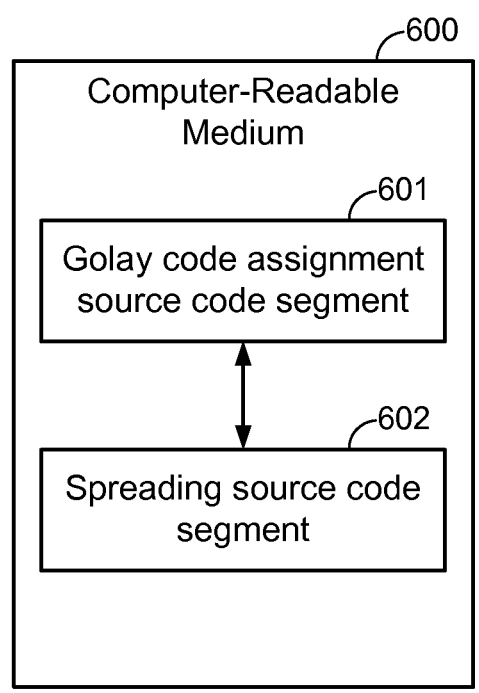
FIG. 6 illustrates software components residing on a computer-readable memory and configured in accordance with a sample aspect of the invention.

FIG. 6 illustrates software components residing on a computer-readable memory 600 and configured in accordance with an aspect of the invention. In this description, the term "memory" refers to data stores, algorithm stores, and other information stores. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems and/or methods herein are intended to comprise, without being limited to, these and any other suitable types of memory.

A Golay code assignment source-code segment 601 is configured for assigning Golay codes to be used for spreading. According to one aspect of the invention, the source-code segment 601 is configured for selecting one or more Golay codes stored in memory. For example, the source-code segment 601 may be configurable for determining cross-correlation values between candidate Golay codes. According to one aspect of the invention, the source-code segment 601 may select Golay codes having low cross-correlation for use in different communication links.

According to another aspect of the invention, the Golay code assignment source-code segment 601 may be configurable for providing a predetermined set of fixed delays $D=[D(0), D(1), \ldots, D(N-1)]$ to a first input signal. The source-code segment 601 may also be configured for multiplying a second input signal by at least one of a plurality of different seed vectors $W^i=[W^i(0), W^i(1), \ldots, W^i(N-1)]$, $i=1, \ldots, L$, where L is the number of Golay code pairs. The source code segment 601 may be programmed with different seed vectors, wherein each seed vector produces a different Golay complementary code pair.

A spreading source code segment 602 is configured for spreading each data symbol with the selected Golay codes to produce a spread signal. For example, the spreading source code segment 602 may randomize the order in which Golay codes are used to spread data. According to one aspect of the invention, the spreading source code segment 602 may be configured for cyclically shifting the selected Golay codes before they are used to spread data.

Aspects of the invention may provide for beamforming in which a first set of beacon signals is transmitted using a set of quasi-omni directional patterns, followed by transmitting a second set of beacon signals on a predetermined number of directional beam patterns. Such aspects may provide for different spreading gains for different beam patterns. For example, higher spreading gains may be selected for quasi-omni patterns than for directional beacon patterns.

FIG. 7 is a flow diagram for a communication method in accordance with an aspect of the invention. A first beacon signal is constructed 701 and transmitted 703 over a set of R quasi-omni beam patterns. The set of R quasi-omni transmissions employs common-mode transmissions, which typically have the highest spreading gain of the available transmission modes. According to one aspect of the invention, transmitting the first beacon signal 703 comprises simultaneously transmitting the first beacon signal over the set of R quasi-omni beam patterns. According to an alternative aspect of the invention, transmitting the first beacon signal 703 comprises sequentially transmitting the first beacon signal over the set of R quasi-omni beam patterns. For example, the first beacon signal is transmitted in R different directions, wherein each direction corresponds to one of the R quasi-omni beam patterns. Each of the R quasi-omni beam patterns is transmitted at a different time. Thus, the first beacon signal is transmitted once on each of the R quasi-omni beam patterns and at different times.

The first beacon signal comprises a preamble, a header, and a data portion. In accordance with one aspect of the invention, the preamble comprises 32 repetitions of a length-128 Golay code, and the data is spread with one or more length-64 Golay codes. In other aspects of the invention, Golay codes may have different lengths and/or different numbers of repetitions. The header or data portion of the first beacon may include information about the second beacon signal. For example, the directional beacon information may include the Golay-set number s (where s can be $0, 1, \ldots S-1$), the Golay code length used in the preamble, the number of repetitions used in the preamble, and the Golay code length for header and data spreading.

A second beacon signal is constructed 702 and transmitted 704 over a set of directional beam patterns. A directional beam pattern may include directional beams generated from an antenna array or sector directions generated by sector antennas. The second beacon signal may comprise a plurality of directional beacon signals. In accordance with one aspect of the invention, the directional beacon signals are transmitted 704 simultaneously over the set of directional beam patterns. According to an alternative aspect, the directional beacon signals are transmitted 704 sequentially over the set of directional beam patterns. For example, the directional beacon signals are transmitted in Q different directions, wherein each direction corresponds to one of Q directional beam patterns. Each directional beacon signal is transmitted once on one of the Q directional beam patterns, and each transmission occurs at a different time.

The second beacon signal may use shorter Golay codes and fewer repetitions in the preamble than the first beacon signal. For example, if the device transmitting the directional beacons has an antenna gain of 6 dB=10 $\log_{10}(4)$, it may use a length-64 Golay code during the preamble that is repeated only 16 times, and the data may be spread with length-16 Golay codes. This is equivalent to an overall spreading gain equal to one-fourth that of the common mode.

Constructing the first beacon signal 701 and constructing the second beacon signal 702 may comprise generating Golay code sets having a set of lengths (e.g., code lengths M=8, 16, 32, 64, 128, 256, and/or 512). Delay vectors and seed vectors may be selected for generating the code sets. For the above-recited code lengths, delay-vector and seed-vector lengths would include N=3, 4, 5, 6, 7, 8, and 9. For each code length, a set of up to six code sets may be selected, such as described in U.S. patent application Ser. No. 11/599,725.

Each code-set comprises a fixed delay vector $D=[D_0, D_1 \ldots D_{N-1}]$ of length $N=\log_2(M)$ and all the seed vectors $W=[W_0, W_1 \ldots W_{N-1}]$. The number of binary seed vectors ($W_k = \pm 1$, k=0, 1, ..., N-1) is 2N, and the number of complex seed vectors ($W_k = \pm 1$ or $\pm j$, k=0, 1, ..., N-1) is 4N. The binary seeds may be used for common-mode signaling in the quasi-omni beacons. The directional beacons may choose to implement complex seed vectors.

Constructing the first beacon signal 701 comprises selecting Golay code sets for use with the quasi-omni transmissions, and constructing the second beacon signal 702 comprises selecting Golay code sets for use with the directional transmissions. The codes are selected such that their spreading gains compensate for the differences in antenna gain between the quasi-omni and directional beams. Code set selection also comprises selecting code sets for the preamble and data transmissions having the same spreading-gain criteria.

In one aspect, devices in a piconet may use the common mode for quasi-omni beacons. The common mode may include a length-128 code for the preamble with 32 repetitions. This code may be generated using one binary seed vector only (e.g., one fixed delay vector of length 7 and one fixed seed vector of length 7). For the directional beacon with antenna gain of 6 dB, the preamble code set is implemented using one binary or complex seed vector and has length 64 (one fixed delay vector of length 6 and one fixed seed vector of length 6) and 16 repetitions, which provides one-fourth of the spreading gain of the common-mode preamble. Alternatively, the directional beacon may employ a Golay code of length 128 and provide for 8 repetitions, which also provides one-fourth of the spreading gain of the common-mode preamble.

FIG. 8 is a block diagram of an apparatus configured in accordance with an aspect of the invention. A means for transmitting a first beacon signal via a set of quasi-omni beam patterns comprises a beam-pattern generator 803 and a transmitter 804. A means for transmitting a second beacon signal via a set of directional beam patterns also comprises the beam-pattern generator 803 and the transmitter 804. In this case, the beam-pattern generator 803 is configured for generating beam-forming weights for an antenna array that is part of the transmitter 804. The beam-forming weights comprise both quasi-omni beam pattern weights and directional beam pattern weights.

A beacon signal generator 802 employs Golay codes generated by a means for generating Golay codes, such as a Golay code generator 801, to produce a first beacon signal for transmission on a plurality of quasi-omni beam patterns. The beacon signal generator 802 also uses the Golay codes to produce a second beacon signal for transmission on a plurality of directional beam patterns. The beacon signal generator 802 produces the first beacon signal such that its transmission rate is higher than the transmission rate associated with the second beacon signal. For example, the second beacon signal may use shorter Golay codes and fewer repetitions in the preamble than the first beacon signal.

Figure 9:
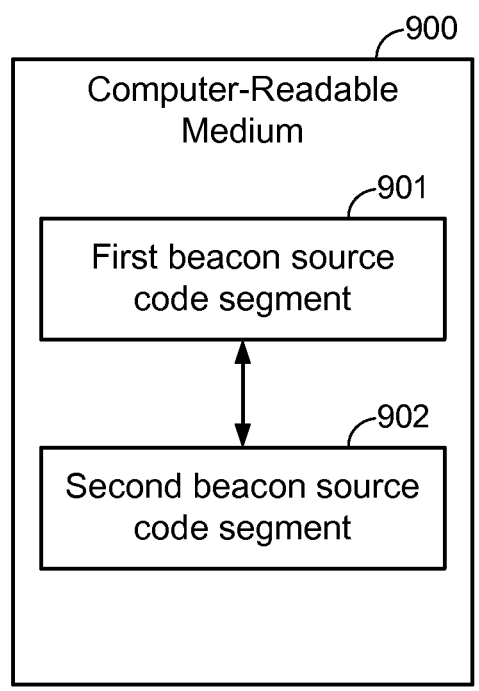
FIG. 9 illustrates software components residing on a computer-readable memory and configured in accordance with a sample aspect of the invention.

FIG. 9 illustrates software components residing on a computer-readable memory 900 and configured in accordance with an aspect of the invention. A first beacon source code segment 901 is configured for constructing a first beacon signal for transmission via a set of quasi-omni beam patterns. The first beacon signal is constructed from one or more Golay codes to provide for a first transmission rate. A second beacon source code segment 902 is configured for constructing a second beacon signal for transmission via a set of directional beam patterns. The second beacon signal is constructed from one or more Golay codes to provide for a second transmission rate. The second beacon signal may use shorter Golay codes and fewer repetitions in the preamble than the first beacon signal. Thus, the first transmission rate will be higher than the second transmission rate.

Figure 10:
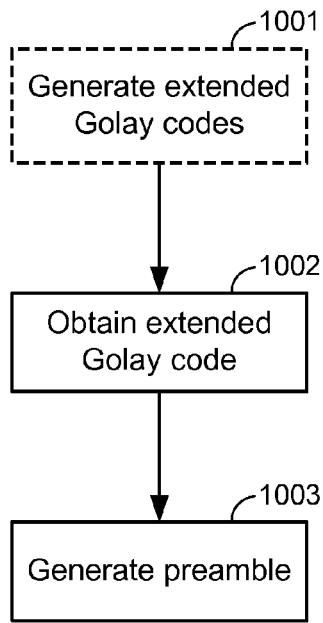
FIG. 10 is a flow diagram depicting a sample method for generating a preamble with a set of extended Golay codes having low-cross-correlation.

FIG. 10 is a flow diagram depicting a method for generating a preamble with a set of extended Golay codes having low-cross-correlation. In one aspect of the invention, a family of Golay codes may be extended by using a Kronecker product of short sequences with Golay codes to obtain a larger set of Golay codes (i.e., extended Golay codes) with improved cross-correlation properties. For example, an optional step of generating extended Golay codes 1001 may comprise employing the functions kron([1 1 1 1], golay64) and kron ([1-1 1-1], golay64) to generate length-256 sequences of extended Golay codes having zero periodic cross-correlation.

In a related aspect, the Kronecker product of the following four sequences $$\begin{bmatrix} 1 & 1 & 1 & 1 \\ 1 & -1 & 1 & -1 \\ 1 & j & -1 & -j \\ 1 & -j & -1 & j \end{bmatrix}$$

with the a Golay code of length 64 produces four sequences of length 256 having zero periodic cross-correlations.

A code-set of length-64 (e.g., one fixed delay vector of length 6 and one or more binary seed vectors of length 6) may be selected for data spreading in the quasi-omni case, whereas a length-16 code-set (one fixed delay vector of length 4 and multiple binary or complex seed vectors of length 4) may be used in the directional case. Alternatively, a code-set of length 16 (one fixed delay vector of length 4 and all binary or complex seed vectors of length 4) may be employed for the quasi-omni case, and a code-set of length 8 (one fixed delay vector of length 3 and all binary or complex seed vectors of length 3) may be used in the directional case.

Extended Golay codes with zero cross-correlation may be selected 1002 for different preambles, and one or more preambles may be generated 1003 from the selected codes.

Figure 11:
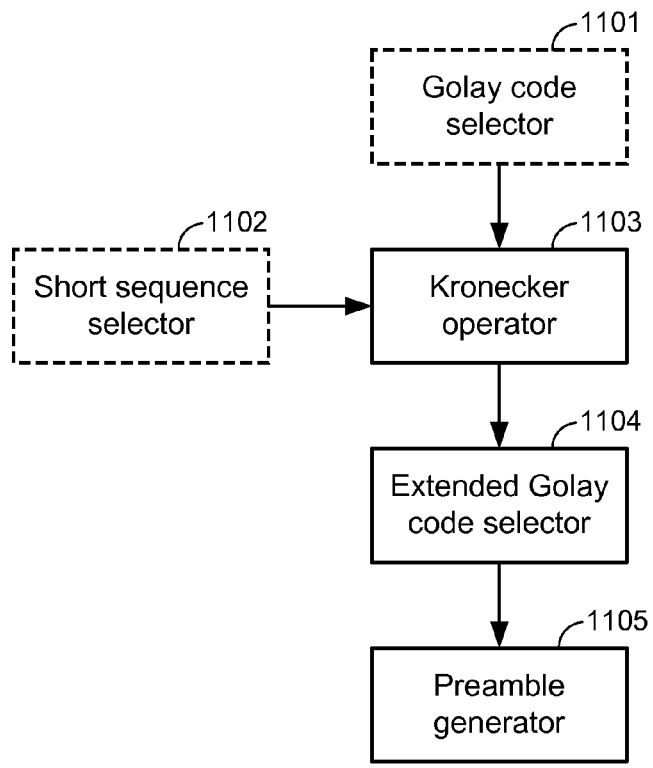
FIG. 11 is a block diagram of a sample apparatus configured for generating a preamble.

FIG. 11 is a block diagram of an apparatus configured for generating a preamble. A means for obtaining an extended Golay code may comprise an optional Golay code selector 1101, an optional short-sequence selector 1102, a Kronecker operator 1103, and an extended Golay code selector 1104. The Golay code selector 1101 may be configured to generate one or more Golay codes or select one or more Golay codes from a memory. The short-sequence selector 1102 may be configured to generate one or more short sequences or select one or more short sequences from a memory. The short sequences may comprise rows of a Fourier transform matrix or rows of a Hadamard matrix.

The Kronecker operator 1103 is configurable for performing a Kronecker product of the selected Golay codes with the selected short sequences to produce a set of extended Golay codes having zero periodic cross-correlation. The extended Golay code selector 1104 is configured to select an extended Golay code from the set of extended Golay codes to provide a selected extended Golay code.

A means for generating a preamble may comprise a preamble generator 1105 configurable for using the selected extended Golay code to generate the preamble.

Figure 12:
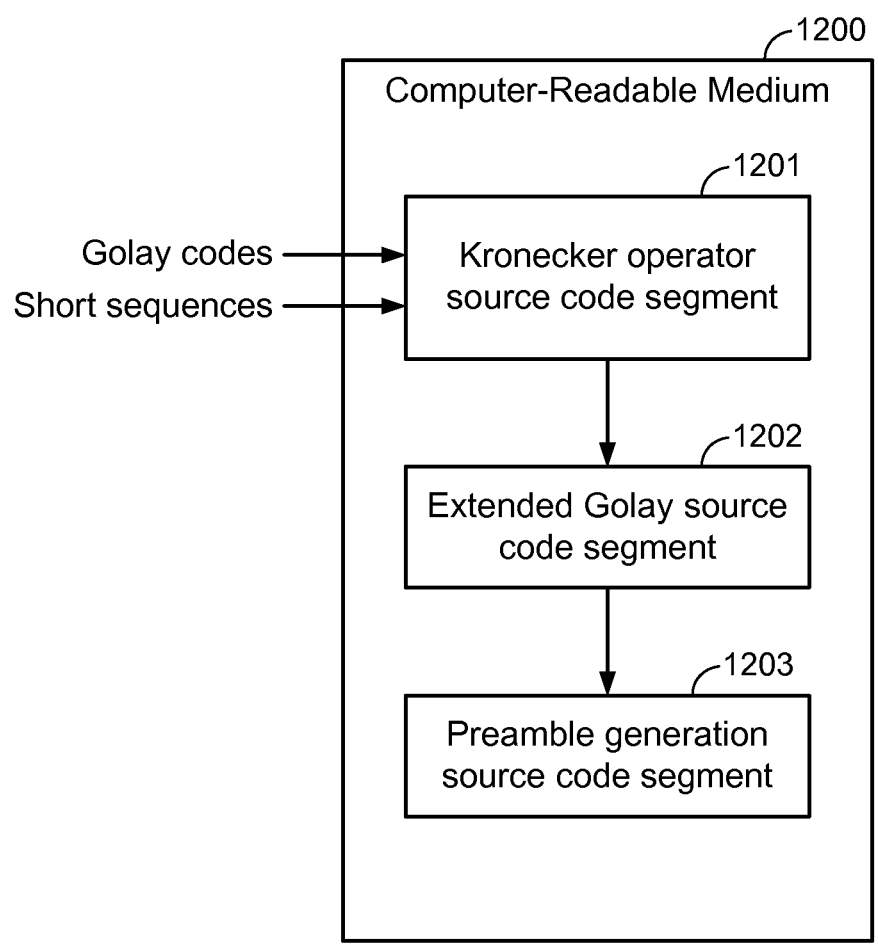
FIG. 12 illustrates software components residing on a computer-readable memory and configured in accordance with a sample aspect of the invention.

FIG. 12 illustrates software components residing on a computer-readable memory 1200 and configured in accordance with an aspect of the invention. A Kronecker operator source code segment 1201 is configured for performing a Kronecker product operation of an input set of Golay codes with an input set of short sequences to produce a set of extended Golay codes having zero periodic cross-correlation. An extended Golay source code segment 1202 is configured for selecting an extended Golay code from the set of extended Golay codes to provide a selected extended Golay code. A preamble generation source code segment 1203 is configurable for using the selected extended Golay code to generate a preamble.

In one aspect of the invention, the input set of Golay codes may be generated by a Golay code generation source code segment (not shown) residing on the computer-readable memory 1200, and the input set of short sequences may be produced by a short sequence generation source code segment (not shown) residing on the computer-readable memory 1200. The short sequence generation source code segment (not shown) may be configured to generate a Fourier transform matrix or a Hadamard matrix.

Figure 13:
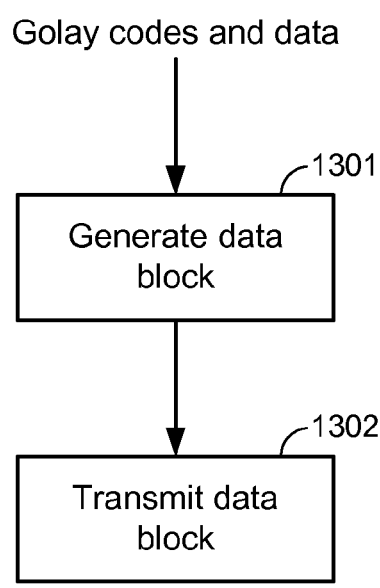
FIG. 13 is a flow diagram depicting a sample method for generating a communication signal for transmission.

In yet another aspect of the invention, a method for generating a communication signal for transmission shown in FIG. 13 comprises generating a data block 1301 from input Golay codes and data portions, wherein every data portion of the data block is between two Golay codes, and transmitting the data block 1302. A data payload is either generated dynamically or obtained from the MAC layer. The payload is scrambled, encoded, and then partitioned into data blocks. The data blocks are partitioned into data portions, and Golay codes are inserted in between the data portions. A sub-block, as used herein, may comprise a data portion followed by a Golay code or a data portion preceded by a Golay code.

Figure 15:
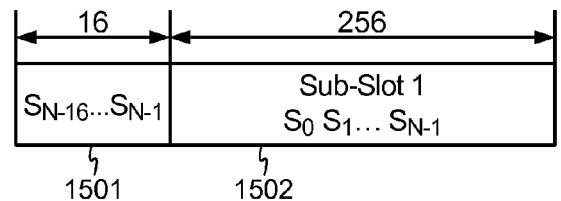
FIG. 15 shows a sample format of a sub-slot structure.

FIG. 15 shows a sub-block that comprises a cyclic prefix 1501 and a sub-slot 1502. A sub-slot may comprise a Golay-code modulated data sequence. For example, the Golay-code modulated data sequence may comprise $\{a_{64}d_0, a_{64}d_1, a_{64}d_2, a_{64}d_3\}$ where $d_0, d_1, d_2$ and $d_3$ can be binary, i.e. ±1, complex or multilevel. Thus, a sub-block comprises a data portion (i.e., a data sub-slot) and may further comprise at least one of a cyclic prefix and a cyclic postfix. Assuming an FFT length of 256 and a channel delay of 16 symbols, the last 16 symbols of the 256-length sub-slot 1502 are typically copied and appended to the front of the sub-slot 1502 as cyclic prefix 1501. This copy is necessary to make the convolution cyclic, but it is not used in any other way.

Figure 16:
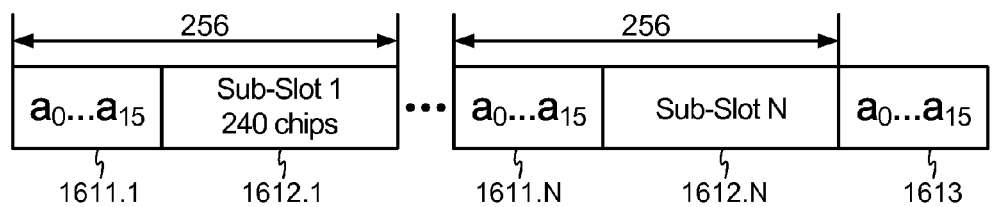
FIG. 16 shows a sample format of a sub-block structure in which the sub-slot length is reduced by the channel delay.

FIG. 16 illustrates an alternative aspect of the invention in which the sub-slot length may be reduced by the channel delay. The term channel delay, as used herein, is meant to include any evaluation of channel delay, including, but not limited to, mean delay, maximum delay, root-mean-squared (rms) delay spread, average rms delay spread, and mean delay spread. For example, the sub-slot 1612.1 length may be 256−16=240 symbols. A Golay sequence of length 16 is used as the prefix 161 1.1, and a postfix 1613 is appended to the last sub-slot 1612.N of the sequence of sub-slots. Thus, a sub-block may comprise a data portion (i.e., a sub-slot) preceded by a Golay sequence, a sub-block followed by a Golay sequence, or any combination thereof. In this aspect, the Golay sequence is the same for all sub-slots 1612.1-1612.N. In other aspects, the Golay sequences employed in cyclic prefixes may alternate between sequence a and sequence b. In this case, the convolution is still cyclic, so equalization in the frequency domain is still provided. However, the cyclic prefix 1611.1 and postfix 1613 can now be used to track the channel and timing and frequency offsets using the Golay receiver aspects of the invention. It is anticipated that this aspect may be adapted to alternative FFT lengths, channel delay spreads, and/or Golay code lengths without departing from the scope of the invention.

Figure 17:
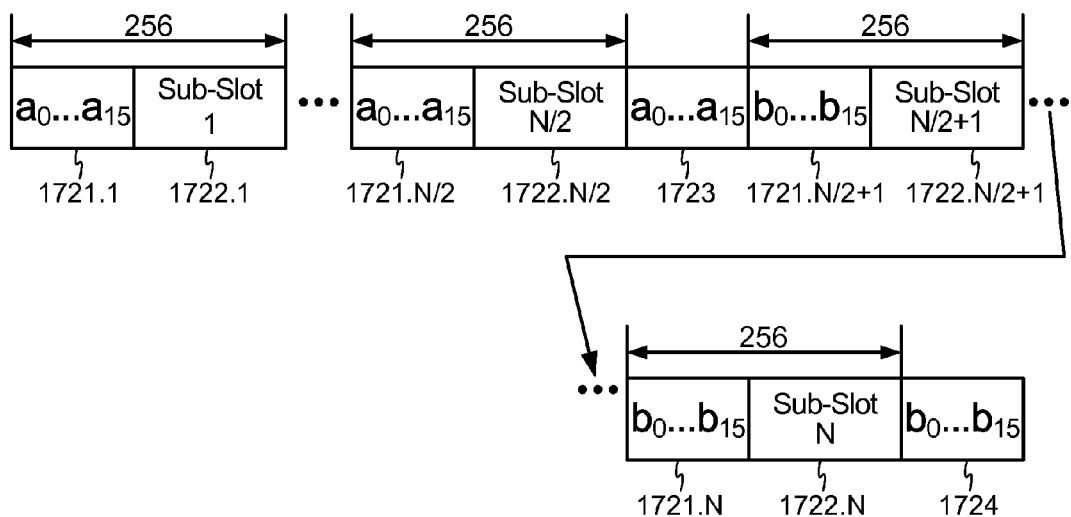
FIG. 17 illustrates a sample block structure in which each of the first N/2 sub-slots in a first block employs a first complementary Golay code as a prefix.

FIG. 17 illustrates an aspect of the invention in which each of the first N/2 sub-slots 1722.1-1722.N/2 employs a first complementary Golay code a as a prefix 1721.1-1721.N/2, respectively. Each of the next N/2 sub-slots 1722.(N/2+1)-1722.N employs a second complementary Golay code b as a prefix 1721.(N/2−1)-1721.N, respectively. Furthermore, sub-slot 1722.N/2 employs a postfix 1723, and sub-slot 1722.N employs a postfix 1724.

Figure 18:
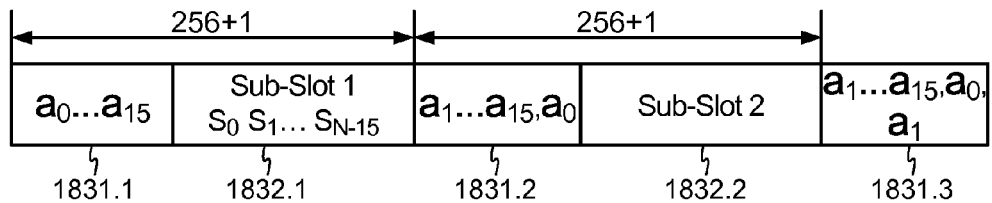
FIG. 18 illustrates a sub-block structure in accordance with a sample aspect of the invention configured to reduce the presence of spectral lines due to periodic structure in the frame.

FIG. 18 illustrates a sub-block structure in accordance with an aspect of the invention configured to reduce the presence of spectral lines due to periodic structure in the frame. Since the prefix occurs at regular intervals, if the same prefix is used in each interval, the transmission has at least one strong spectral line in the frequency domain. Aspects of the invention may employ a different prefix for each of a plurality of sub-slots in order to reduce or eliminate spectral lines resulting from the periodic structure in the frame. For example, a cyclic prefix generator may be configured to cyclically shift the Golay code used in the cyclic prefix 1831.1-1831.3 for each sub-slot by a predetermined number of chips C. FIG. 18 shows the case where the Golay code is cyclically shifted by C=1 chip for each successive sub-slot. The data sub-slot length including the Golay-code length is 256+1, since only the last 15 chips of the prefix is cyclic with the first 15 chips of the following postfix.

Each sub-slot may comprise a single-carrier or an OFDM signal. However, the sub-slot length may differ for each mode. Furthermore, sub-slot length may vary, such as with respect to channel conditions, or various alternative parameters.

In one aspect of the invention, the sub-slot length is set to a multiple of the parallel processing factor of the receiver (e.g., 4). In this case, the sub-slot length may be 244 while the Golay code is still of length 16. The cyclic shift is selected to be C=4, such that the cyclic-prefix length is 16−C=12 and the FFT length 256 is performed over each sub-slot and the 12 repeated chips of the Golay code.

Figure 19:
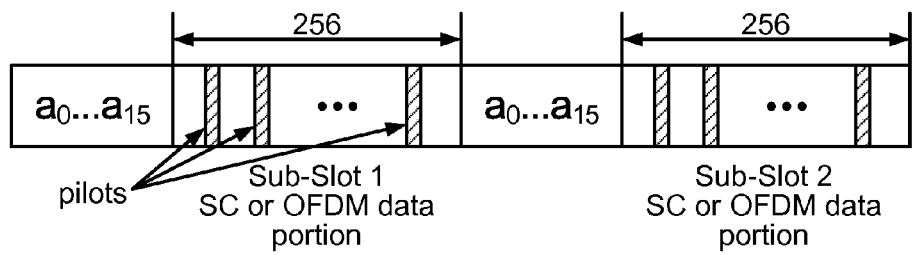
FIG. 19 illustrates a sub-block structure that may be employed in various aspects of the invention.

FIG. 19 illustrates a sub-block structure that may be employed in various aspects of the invention. A unified single-carrier and OFDM sub-block structure is provided wherein each sub-slot contains a single-carrier signal or an OFDM data portion, and the sub-slot length corresponds to an FFT length. Each sub-slot may have time-domain and/or frequency-domain pilot symbols, such as may be used for timing and frequency tracking. Time-domain pilot symbols are typically used in the single-carrier case and known frequency-domain pilots are employed with OFDM transmissions. The pilots may be scrambled in time or frequency to minimize spectral lines.

A known Golay code $\{a_0, a_1, \ldots, a_{L-1}\}$ of length L (e.g., L=16) is inserted before each sub-slot, and it may be used for timing, frequency, and channel tracking. Furthermore, the Golay code may be cyclically shifted as previously described to mitigate spectral lines. Some aspects of the invention are configured to transmit data having the structure shown in FIG. 19. However, the received signal $x_{0:N-1}$ corresponding to a sub-slot is not a cyclic convolution between the data and the channel impulse response.

The received signal corresponding to the Golay code after sub-slot 1 is denoted as $y_{0:L-1}$. We form the following vector $z_{0:N-1}$, where $$z_k = x_k + y_k \text{ for } k=0,\ldots,L-1 \text{ and } z_k = x_k \text{ for } k=L,\ldots,N-1.$$

The constructed signal $z_{0:N-1}$ has two components $z^{(1)}$ and $z^{(2)}$, where $$z_n^{(1)} = u_n \otimes h_n \, n=0, 1, \ldots, N-1$$

is the cyclic convolution of length N between the channel and the transmitted data in the sub-slot, sub-slot data is denoted $u_0, u_1, \ldots, u_{N-1}$, and $$z_n^{(2)} = a_n \otimes h_n \, n=0, 1, \ldots, L-1$$

is the cyclic convolution of length L between the channel and the known Golay code. This latter part affects only the first L samples of $z_{0:N-1}$.

In order to make the convolution cyclic, $z_n^{(2)}$ n=0, 1, ..., L-1 can be computed since the Golay code is already known and the channel is estimated at the receiver, then subtracted from the first L samples from z. The resulting vector is $z_n^{(1)}$ n=0, 1, ..., N-1, which is a cyclic convolution. Those skilled in the art will note that there are many known fast algorithms to compute the cyclic convolution $z_n^{(2)} = a_n \otimes h_n$, n=0, 1, ..., L-1. The cyclic convolution allows OFDM equalization and single-carrier equalization, including frequency-domain equalization.

Figure 20:
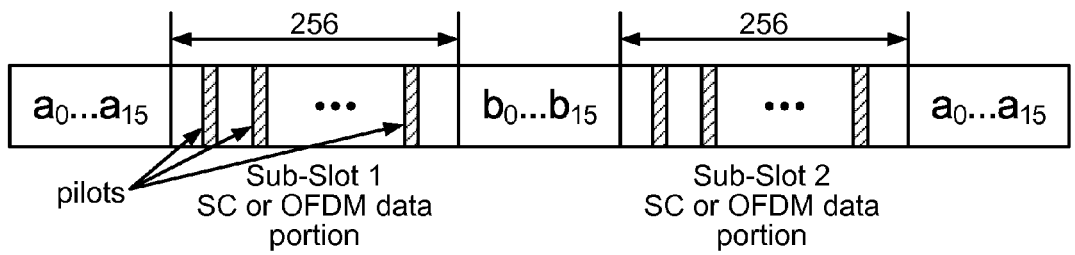
FIG. 20 illustrates a sub-block structure in which complementary Golay code a is inserted before even-numbered sub-slots, complementary Golay code b is inserted before odd-numbered sub-slots, and known pilot chips or tones are inserted in some or all of the sub-slots.

FIG. 20 illustrates another aspect of the invention in which complementary Golay code a is inserted before even numbered sub-slots, complementary Golay code b is inserted before odd numbered sub-slots, and known pilot chips or tones are inserted in some or all of the sub-slots. The use of complementary Golay codes in this manner provides several benefits. For example, improved channel tracking may be achieved because the sum of the autocorrelations of the two sequence a and b is a Dirac function in the time-domain, and therefore has no sidelobes. The time-domain Dirac function is flat in the frequency domain, thus it does not produce spectral lines.

The term $x_{0:N-1}$ is denoted as the received vector corresponding to a sub-slot, and $y_{0:L-1}$ is the vector corresponding to the Golay code following the sub-slot. The vector $z_{0:N-1}$ has the following three components:

$$z_n^{(1)} = u_n \otimes h_n \, n=0, 1, \ldots, N-1,$$

which is the cyclic convolution of length N between the channel and the transmitted data in the sub-slot, $$z_n^{(2)} = \left(\frac{a_n + b_n}{2}\right) \otimes h_n \, n=0, 1, \ldots, L-1,$$

which is the cyclic convolution of length L between the channel and the average of the two Golay code, and $$\begin{bmatrix} z_0^{(3)} \\ z_1^{(3)} \\ \vdots \\ z_{15}^{(3)} \end{bmatrix} = \begin{bmatrix} h_0 & -h_1 & \cdots & -h_{L-1} \\ h_1 & h_0 & \cdots & -h_{L-2} \\ \vdots & \vdots & \ddots & \vdots \\ h_{L-1} & h_{L-2} & \cdots & h_0 \end{bmatrix} \begin{bmatrix} (a_0 - b_0)/2 \\ (a_1 - b_1)/2 \\ \vdots \\ (a_{L-1} - b_{L-1})/2 \end{bmatrix},$$

which is the pseudo-cyclic convolution of length L between the channel and the difference of the two Golay codes. The matrix is pseudo-circulant.

In order to make the convolution cyclic, the second term $z_n^{(2)}$ n=0, 1, ..., L-1, and third term, $z_n^{(3)}$ n=0, 1, ..., L-1 can be computed and subtracted from the first L terms of z. The second and third terms involve known quantities, so they can be computed easily. Those skilled in the art will appreciate the availability of fast algorithms that compute cyclic and pseudo-cyclic convolutions.

The resulting value is $z_n^{(1)} = u_n \otimes h_n$ n=0, 1, ..., N-1, which is a cyclic convolution between the unknown data and the estimated channel. Conventional OFDM equalization is now possible, as well as any of the various single-carrier equalization schemes, including frequency domain equalization.

In one aspect, an apparatus is configured for generating a sub-slot transmission sequence with a cyclic prefix and a cyclic postfix. In the case wherein the apparatus employs a Fourier transform of length N, a Golay sequence generator is configured for generating a Golay sequence comprising M symbols, wherein M<N. A sub-slot sequence generator produces a Golay-code modulated data sequence having a sub-slot length of N–M symbols, and a cyclic prefix generator employs the Golay sequence to produce the cyclic prefix (and a cyclic postfix), wherein each of the cyclic prefix and the cyclic postfix comprises M symbols. At least one of the cyclic prefix generator and the Golay sequence generator is configured to change the Golay used in the cyclic prefix. For example, the Golay code may be cyclically shifted for each cyclic prefix. Alternatively, different Golay codes may be used such that the code changes for each successive cyclic prefix.

Figure 14:
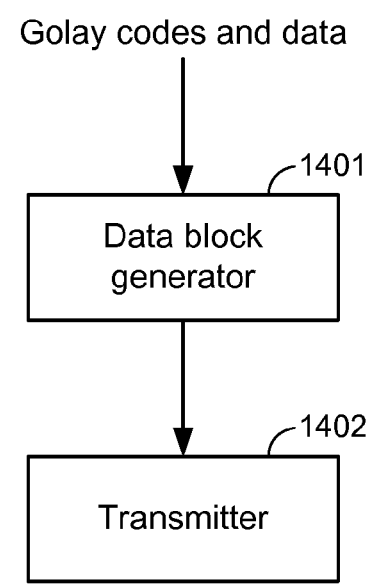
FIG. 14 is a block diagram of an apparatus configured for generating a signal in accordance with a sample aspect of the invention.

FIG. 14 is a block diagram of an apparatus configured for generating a signal in accordance with an aspect of the invention. A means for generating a first data block comprising Golay codes and data portions may include a data block generator 1401 configured for receiving the Golay codes and data. The data block generator 1401 is configured for generating data blocks wherein every data portion is between two Golay codes. A means for transmitting the data block may comprise a transmitter 1402 configured to up-convert, amplify, and couple the data block into a wireless communication channel.

In one aspect of the invention, the Golay codes employed in the data portion are identical. In another aspect, the Golay codes comprise cyclic shifts of a seed Golay code. In another aspect, the Golay codes comprise complementary Golay codes. A sub-block may comprise one of the Golay codes and one of the data portions, or a portion of a first one of the Golay codes followed by one of the data portions followed by a portion of a second one of the Golay codes. Each sub-block may comprise a number of chips that is a power of two or a power of two plus one. In some aspects, the data portion may have a length that is power of two.

In one aspect of the invention, a first one of the Golay codes functions as a cyclic prefix of a sub-block comprising one of the data portions followed by a second one of the Golay codes. The sub-blocks may be demodulated by using cyclic prefix and cyclic postfix portions of the Golay codes. In another aspect, a first one of the Golay codes functions as a cyclic postfix of a sub-block comprising a second one of the Golay codes followed by one of the data portions. The Golay-code length may be configurable with respect to various parameters. For example, the Golay-code length may be a function of multipath delay.

The apparatus shown in FIG. 14 may be configured to generate a first data block employing a first set of Golay codes, and a second data block using Golay codes that are different from the Golay codes used to generate the first data block.

The invention is not intended to be limited to the preferred aspects. Furthermore, those skilled in the art should recognize that the method and apparatus aspects described herein may be implemented in a variety of ways, including implementations in hardware, software, firmware, or various combinations thereof. Examples of such hardware may include ASICs, Field Programmable Gate Arrays, general-purpose processors, DSPs, and/or other circuitry. Software and/or firmware implementations of the invention may be implemented via any combination of programming languages, including Java, C, C++, Matlab™, Verilog, VHDL, and/or processor specific machine and assembly languages.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The method and system aspects described herein merely illustrate particular aspects of the invention. It should be appreciated that those skilled in the art will be able to devise various arrangements, which, although not explicitly described or shown herein, embody the principles of the invention and are included within its scope. Furthermore, all examples and conditional language recited herein are intended to be only for pedagogical purposes to aid the reader in understanding the principles of the invention. This disclosure and its associated references are to be construed as being without limitation to such specifically recited examples and conditions. Moreover, all statements herein reciting principles, aspects, and aspects of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be appreciated by those skilled in the art that the block diagrams herein represent conceptual views of illustrative circuitry, algorithms, and functional steps embodying principles of the invention. Similarly, it should be appreciated that any flow charts, flow diagrams, signal diagrams, system diagrams, codes, and the like represent various processes that may be substantially represented in computer-readable medium and so executed by a computer or processor, whether or not such computer or processor is explicitly shown.

What is claimed is:

1. A method of communication, comprising:
transmitting a first beacon signal via a set of quasi-omni beam patterns; and
transmitting a second beacon signal via a set of directional beam patterns, wherein a first rate associated with the transmission of the first beacon signal is higher than a second rate associated with the transmission of the second beacon signal, and wherein
the first rate is a function of Golav code length and number of Golav code repetitions used in a preamble of the first beacon signal, and the second rate is a function of Golay code length and number of Golay code repetitions used in a preamble of the second beacon signal.

2. The method recited in claim 1, wherein the first beacon signal is transmitted at different times.

3. The method recited in claim 1, wherein the second beacon signal is transmitted at different times.

4. The method recited in claim 1, wherein information about signal structure associated with the second beacon signal is transmitted in the first beacon signal.

5. An apparatus for communication comprising:
means for transmitting a first beacon signal via a set of quasi-omni beam patterns; and means for transmitting a second beacon signal via a set of directional beam patterns, wherein a first rate associated with the transmission of the first beacon signal is higher than a second rate associated with the transmission of the second beacon signal, and wherein
the first rate is a function of Golay code length and number of Golay code repetitions used in a preamble of the first beacon signal, and the second rate is a function of Golay code length and number of Golay code repetitions used in a preamble of the second beacon signal.

6. The apparatus recited in claim 5, wherein the first beacon signal is transmitted at different times.

7. The apparatus recited in claim 5, wherein the second beacon signal is transmitted at different times.

8. The apparatus recited in claim 5, wherein information about signal structure associated with the second beacon signal is transmitted in the first beacon signal.

9. A non-transitory machine-readable medium comprising instructions encoded thereon and executable to:
   transmit a first beacon signal via a set of quasi-omni beam patterns; and
   transmit a second beacon signal via a set of directional beam patterns, wherein a first rate associated with the transmission of the first beacon signal is higher than a second rate associated with the transmission of the second beacon signal, and wherein
   the first rate is a function of Golay code length and number of Golay code repetitions used in a preamble of the first beacon signal, and the second rate is a function of Golay code length and number of Golay code repetitions used in a preamble of the second beacon signal.

10. An apparatus for communication, comprising:
    a first module configured to transmit a first beacon signal via a set of quasi-omni beam patterns; and
    a second module configured to transmit a second beacon signal via a set of directional beam patterns, wherein a first rate associated with the transmission of the first beacon signal is higher than a second rate associated with the transmission of the second beacon signal, and wherein
    the first rate is a function of Golay code length and number of Golay code repetitions used in a preamble of the first beacon signal, and the second rate is a function of Golay code length and number of Golay code repetitions used in a preamble of the second beacon signal.

11. The apparatus recited in claim 10, wherein the first beacon signal is transmitted at different times.

12. The apparatus recited in claim 10, wherein the second beacon signal is transmitted at different times.

13. The apparatus recited in claim 10, wherein information about signal structure associated with the second beacon signal is transmitted in the first beacon signal.

14. An access terminal for communication, comprising:
    at least one antenna;
    a first module configured to transmit a first beacon signal via a set of quasi-omni beam patterns over the at least one antenna; and
    a second module configured to transmit a second beacon signal via a set of directional beam patterns over the at least one antenna, wherein a first rate associated with the transmission of the first beacon signal is higher than a second rate associated with the transmission of the second beacon signal, and wherein
    the first rate is a function of Golay code length and number of Golay code repetitions used in a preamble of the first beacon signal, and the second rate is a function of Golay code length and number of Golay code repetitions used in a preamble of the second beacon signal.

* * * * *